United States Patent
Beasley et al.

(10) Patent No.: US 7,292,617 B2
(45) Date of Patent: Nov. 6, 2007

(54) REDUCING MUTUAL CHANNEL INTERFERENCE IN FREQUENCY-HOPPING SPREAD SPECTRUM WIRELESS COMMUNICATION SYSTEMS

(75) Inventors: James Beasley, Simi Valley, CA (US); Dennis Dombrowski, Moorpark, CA (US); Matthew Kuiken, Thousand Oaks, CA (US); Wade Mergenthal, Camarillo, CA (US); Spencer Stephens, Los Angeles, CA (US)

(73) Assignee: Strix Systems, Inc., Calabasas, CA (US)

( * ) Notice: Subject to any disclaimer, the term of this patent is extended or adjusted under 35 U.S.C. 154(b) by 743 days.

(21) Appl. No.: 10/701,121

(22) Filed: Nov. 3, 2003
(Under 37 CFR 1.47)

(65) Prior Publication Data
US 2004/0246929 A1    Dec. 9, 2004

Related U.S. Application Data

(63) Continuation of application No. PCT/US02/13879, filed on May 2, 2002.

(60) Provisional application No. 60/288,301, filed on May 2, 2001.

(51) Int. Cl.
*H04B 1/69* (2006.01)
(52) U.S. Cl. .................. 375/132; 375/133; 375/135; 370/330; 370/329; 370/458; 370/349; 455/450
(58) Field of Classification Search .............. 375/132, 375/133, 135; 370/330, 349, 329, 458; 455/450
See application file for complete search history.

(56) References Cited

U.S. PATENT DOCUMENTS

| 4,850,036 | A | 7/1989 | Smith |
| 4,872,205 | A | 10/1989 | Smith |
| 5,394,433 | A | 2/1995 | Bantz et al. |
| 6,157,669 | A | 12/2000 | Kotzin |
| 6,351,643 | B1 | 2/2002 | Haartsen |

(Continued)

FOREIGN PATENT DOCUMENTS

| GB | 2 350 750 A | 12/2000 |
| WO | WO 01/17136 | 3/2001 |
| WO | WO 01/29984 | 4/2001 |

*Primary Examiner*—Chieh M. Fan
*Assistant Examiner*—Eva Zheng
(74) *Attorney, Agent, or Firm*—Perkins Coie LLP (57) ABSTRACT

A system and method for arbitrating among frequency-hopping spread spectrum communication systems are provided herein. An arbitrator calculates and compares hop frequencies for the communication systems of an area or network using frequency generation parameters received from the communication systems. The comparison identifies impending transmission collisions and collision frequencies for transmission time slots. The arbitrator then selects one of the radios associated with an impending collision to transmit, and suppresses or disables transmissions by non-selected radios during the same transmission time period for that frequency. Thus, the arbitrator minimizes bandwidth lost to co-channel and adjacent channel collisions by reducing or eliminating this mutual interference among the communication systems.

33 Claims, 7 Drawing Sheets

U.S. PATENT DOCUMENTS

| | | |
|---|---|---|
| 6,760,319 B1 * | 7/2004 | Gerten et al. ................ 370/335 |
| 6,928,061 B1 * | 8/2005 | Garcia-Luna-Aceves et al. .......................... 370/329 |
| 7,016,396 B2 * | 3/2006 | Agrawal et al. ............ 375/135 |
| 7,099,671 B2 * | 8/2006 | Liang ......................... 455/450 |
| 7,139,285 B2 * | 11/2006 | Agrawal et al. ............ 370/458 |
| 2002/0075941 A1 * | 6/2002 | Souissi et al. .............. 375/133 |
| 2003/0016651 A1 * | 1/2003 | Kwok et al. ................. 370/349 |

* cited by examiner

REDUCING MUTUAL CHANNEL INTERFERENCE IN FREQUENCY-HOPPING SPREAD SPECTRUM WIRELESS COMMUNICATION SYSTEMS

CROSS-REFERENCE TO RELATED APPLICATION(S)

This application is a continuation of international application no. PCT/US02/13879 filed May 2, 2002, and claims the benefit of U.S. Provisional Patent Application No. 60/288,301, filed May 2, 2001, both of which are incorporated herein by reference.

TECHNICAL FIELD

The disclosed embodiments relate to wireless systems and networks.

BACKGROUND

Frequency-hopping spread spectrum (FHSS) communications systems operate by subdividing the available bandwidth into a large number of channels, each having different frequencies. In any signaling interval, the transmitted signal occupies one or more of the available channels. The selection of channels in each signaling interval is made by a pseudorandom function. Frequency-hopped spread spectrum systems are generally classified as either fast frequency-hopping systems, or slow frequency-hopping systems depending upon how often the carrier frequency is changed relative to the symbol interval.

Figure 1:
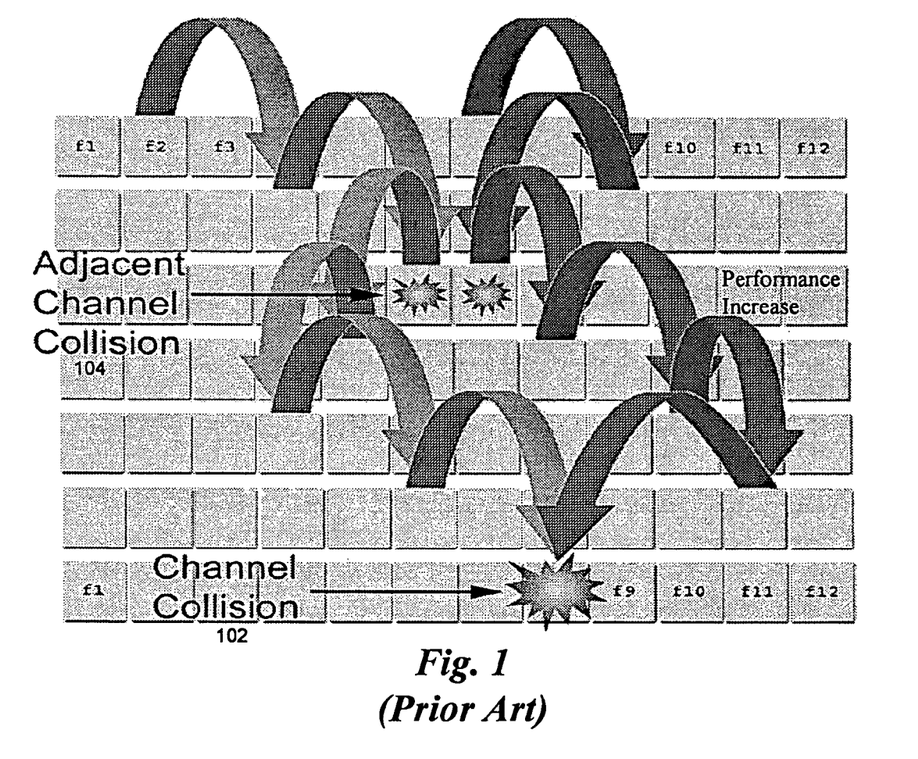
FIG. 1 is a prior art FHSS channel hopping sequence chart showing adjacent and co-channel collisions.

Transmitters in typical FHSS systems are not synchronized with each other. As such there is a chance of mutual interference among transmitters. This mutual interference includes adjacent channel collisions and co-channel collisions. FIG. 1 is a prior art FHSS channel hopping sequence chart showing adjacent and co-channel collisions. The probability of mutual interference is proportional to the number of independent FHSS systems in an area.

When the number of independent FHSS systems in an area is small there is a small chance of mutual interference. This is because a small number of FHSS systems in an area, each using an independent algorithm to generate symbol timing and frequency hop sequence, have a low probability of collision.

When the number of independent FHSS systems operating in an area or region grows, the probability of mutual interference increases because a larger number of systems are competing for the same number of communication channels. Throughput loss is experienced due to channel collisions 102 when two or more transmitters (N) hop to the same frequency, or adjacent channel collisions 104 when two or more transmitters hop to adjacent frequencies. Any receiving systems that happen to be in range of two or more of the N transmitters will experience interference during the time when the transmitters are transmitting. Any data transmitted during that interference time is lost. Recovery methods may be used, but the throughput, or available bandwidth for communications, is reduced in direct proportion to the rate of these channel collisions.

In environments where large numbers of FHSS wireless systems are operating, mutual interference between systems decreases the throughput performance of all systems. Typical methods used to reduce the interference effect of multiple systems transmitting on the same frequency include synchronizing the symbol timing of the systems, and using different hop sequences in each FHSS system. However, these techniques require specific systems, or a network of systems, to track and control transmission frequency calculations for all of the FHSS wireless systems in the area.

To increase throughput performance in systems using Bluetooth™, the use of high performance radios has been recommended to mitigate packet loss in areas with high amounts of interference. This only addresses the adjacent channel interference and does not help co-channel interference. Consequently, the overall effect on throughput is minimal. Further, the use of high performance radios can significantly increase the cost of the Bluetooth™ equipment, thereby making the equipment unaffordable to the targeted consumer.

In the drawings, the same reference numbers identify identical or substantially similar elements or acts. To easily identify the discussion of any particular element or act, the most significant digit or digits in a reference number refer to the Figure number in which that element is first introduced (e.g., element 404 is first introduced and discussed with respect to FIG. 4).

The headings provided herein are for convenience only, and do not necessarily affect the scope or meaning of the claimed invention.

DETAILED DESCRIPTION

To mitigate the effects of the above-described interference, an arbitration system and method are provided herein for reducing or eliminating interference among wireless systems by selectively suppressing system transmissions, thereby minimizing bandwidth lost to channel collisions. The arbiter can arbitrate between frequency-hopping spread spectrum (FHSS) systems, for example Bluetooth™ systems or devices and Direct Sequence Spread Spectrum (DSSS) systems or devices, as well as other systems having similar interference problems. The reduction or elimination of the interference increases the total throughput of the systems in the area.

In FHSS systems, the frequency hop sequence is a product of algorithms that calculate the next transmit frequency over which the systems communicate. Therefore, it is possible in these FHSS systems to determine imminent collisions between N number of systems. Embodiments described below anticipate imminent collisions before transmission, making it possible to change the transmit frequency or sequence of N-1 interfering systems, and thereby avoid mutual interference. Potentially interfering transmissions to original communication destinations by the N-1 transmitters can be deferred to a later time. Thus, collisions between controlled FHSS systems are eliminated. Further, the total data or information throughput of the FHSS wireless systems increases as a result of minimizing the number of packets that must be retransmitted when channel collisions occur. Suppressing transmitters or changing the transmitter channel sequences allows one transmission to succeed when none of the transmissions would have succeeded; thereby reducing the impact of channel collisions.

Aspects of the invention are described in detail below with respect to the Bluetooth™ specification or protocol. Bluetooth™ refers to a specification that standardizes wireless transmissions between a wide variety of systems, such as personal computers (PCs), portable or cordless telephones, headsets, printers, personal digital assistants (PDAs), cellular telephones, etc. Bluetooth™ acts as a virtual cable, whereby a computer can automatically use a mobile telecommunications device, such as a cellular telephone, to send data wirelessly for transactions like exchanging electronic mail and transmitting data to a facsimile machine.

Bluetooth™ operates using frequency-hopping spread spectrum protocols, where data packets are spread across a 2.45 GHz spectrum at a rate of 1,600 hops per second to lessen interference. The nominal link range is 10 meters, and the gross data rate is 1 (one) Mbps, although increases may be possible. Bluetooth™ can support both synchronous connection oriented (SCO) links for voice and asynchronous connectionless (ACL) links for packet data. Information on Bluetooth™ technology can be found at http://www.bluetooth.com, http://www.palowireless.com, "Bluetooth Revealed," Miller & Bisdikian, Prentice Hall PTR, 2001, and "Bluetooth Demystified," Muller, McGraw-Hill, 2001. Further information can be found at "Specification of the Bluetooth System," version 1.1: http://www.bluetooth.com/developer/specification/specification.asp.

The following description provides specific details for a thorough understanding of, and enabling description for, embodiments of the invention. However, one skilled in the art will understand that the invention may be practiced without many of these details. In other instances, well-known structures and functions have not been shown or described in detail to avoid unnecessarily obscuring the description of the embodiments of the invention.

Figure 2:
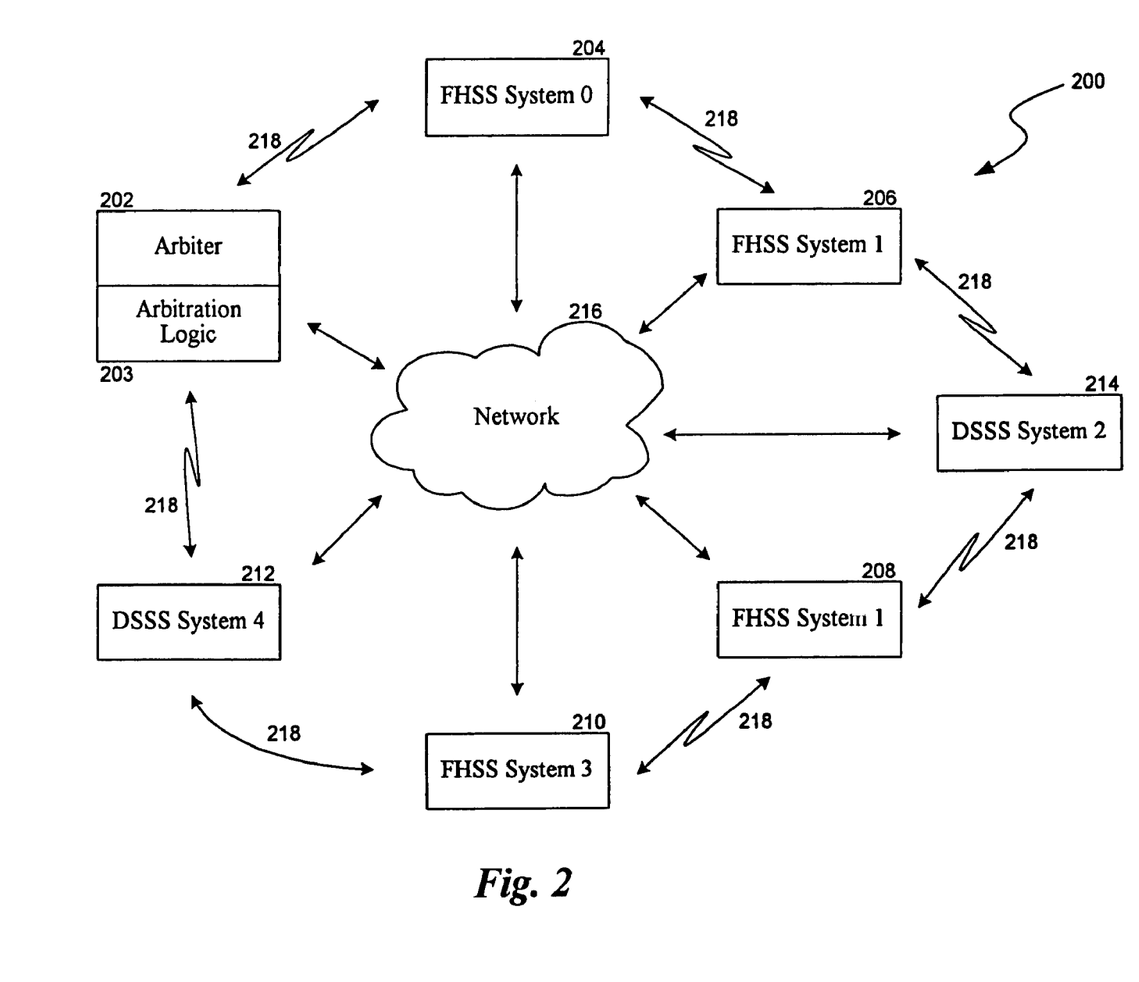
FIG. 2 is a block diagram of a wireless communication system including an arbiter, under one embodiment.

Unless described otherwise below, the construction and operation of the various blocks shown in FIG. 2 are of conventional design. As a result, such blocks need not be described in further detail herein, because they will be understood by those skilled in the relevant art. Such further detail is omitted for brevity and so as not to obscure the detailed description of the invention. Any modifications necessary to the blocks in FIG. 2 (or other embodiments) can be readily made by one skilled in the relevant art based on the detailed description provided herein.

FIG. 2 is a block diagram of a wireless communication system 200 including an arbiter 202, under one embodiment. The wireless communication system 200 includes individual systems or devices 204-214 coupled via a network 216. Each of the systems 204-214 may be base station units that can use different physical layers, although other systems are possible. The arbiter 202 couples with the systems 204-214 either through backend wireless connections 218 or, alternatively, using the network 216.

An arbiter under one embodiment of the invention supports Bluetooth™ systems. Moreover, the arbiter can also support any FHSS system, or a manageable system that could cause a communication collision. Another example of such a manageable system is a Direct Sequence Spread Spectrum (DSSS) system or device, operating under the Institute of Electrical and Electronic Engineers (IEEE) 802.11b standard, which transmits over a broad instantaneous bandwidth. Thus, an example of the wireless communication system 200 includes, but is not limited to, four FHSS wireless Bluetooth™ systems or devices 204-210 and two Direct Sequence Spread Spectrum (DSSS) systems or devices 212-214 operating in combination.

In a FHSS system, the transmitter hops among a fixed number of different frequencies or channels. All of these types of systems use a defined function or method for determining the next hop frequency to use. Using knowledge of the clocks and addresses of systems communicating in an area, transmitters and arbiters of an embodiment determine when collisions will arise between two or more systems hopping to the same frequency or nearby frequencies, as follows.

The value of the pseudorandom hop frequency is a function of a clock value, and a system address. The system address may be a unique address given to each FHSS system when it is manufactured, but this is not necessary for this invention. Using unique system addresses creates unique hopping sequences for every FHSS system. The clock value changes every symbol time. If the clock value and system address are known, the transmit frequency can be calculated.

With reference to FIG. 2, each system 204-214 reports a set of frequency generation parameters to a central arbiter or arbitration source 202. The arbiter 202 of an embodiment includes arbitration logic 203. The frequency generation parameters are the parameters the system uses to calculate the hop frequencies. The arbiter 202 can be a hardware implementation, a software implementation, or a hybrid hardware/software implementation. Further, the arbiter 202 may be centralized in a particular system or device, or it may be distributed among a variety of network systems. The arbitration logic 203 can be stored in non-volatile memory, removable media, such as disks, or hardwired or preprogrammed in chips, such as EEPROM semiconductor chips.

The arbiter of an embodiment, upon calculating the hop frequencies of the participating systems and anticipating a potential collision among two FHSS systems, permits the transmission of one system while suppressing or disabling the transmission of the other system. In this manner, the transmitting system successfully transmits where, if both systems were allowed to transmit, both transmissions would fail as a result of either a co-channel or adjacent channel collision. Thus, where both transmissions or packets would have been lost if both systems transmitted, only the transmission of the suppressed system is lost. The arbiter is scalable to the variety of systems in which it can be installed.

Controlling transmissions to allow the one successful transmission during communication time slots or periods reduces the total number of transmissions, and results in recovery of half the bandwidth that would otherwise have been lost. This is because if both systems transmitted, both would have to retry, using a total of at least four transmissions to send the data. Suppressing one transmission means using only three transmissions to complete the data transfer: one for the transmitting system to send a transmission, one for the suppressed system to wait and avoid the collision, and one for the suppressed system to send its transmission.

The suppressed system of an embodiment can use the time during which a particular transmission is suppressed to communicate on another channel. For example, in Bluetooth™ systems the suppressed system switches to another piconet in a scatternet arrangement to allow it to continue using the bandwidth of the radio. When the suppressed system successfully switches to another channel, all bandwidth that would have been lost in a collision is recovered.

Aspects of the invention described herein support a wireless communication system 200 including, for example, the Pocket Mobility Network™ (PMN) of Strix Systems, Incorporated. The PMN is a Bluetooth™ solution that enables always-on network connections for PDA-equipped or cellular telephone-equipped roaming users. In the PMN, multiple access points or base station units are deployed throughout any location, such as an office building, airport, or other public space, and provide a highly intelligent wireless network based on Bluetooth™ technology. The PMN complements existing wired and wireless networks using access points and network controllers to extend network connections to any Bluetooth™ mobile system. This allows Bluetooth™-equipped system users to maintain persistent, loss-free network connectivity within the service area, for example real-time connections to the Internet and corporate systems, as they move freely about the location. The connection is always present and always on with no need to synchronize or re-establish the network connection.

Unless described otherwise herein, the steps depicted in FIGS. 3 through 6 are well known or described in detail in the above-noted and cross-referenced provisional patent applications. Indeed, much of the detailed description provided herein is explicitly disclosed in the provisional patent applications; most or all of the additional material of aspects of the invention will be recognized by those skilled in the relevant art as being inherent in the detailed description provided in such provisional patent applications, or well known to those skilled in the relevant art. Those skilled in the relevant art can implement aspects of the invention based on the flowcharts of FIGS. 3 through 6 and the detailed description provided in the provisional patent applications.

Each of the steps depicted in FIGS. 3 through 6 is of a type well known in the art, and can itself include a sequence of operations that need not be described herein. Those skilled in the relevant art can create source code, microcode, program logic arrays or otherwise implement the invention based on the flowcharts of FIGS. 3 through 6 and the detailed description provided herein.

Figure 3:
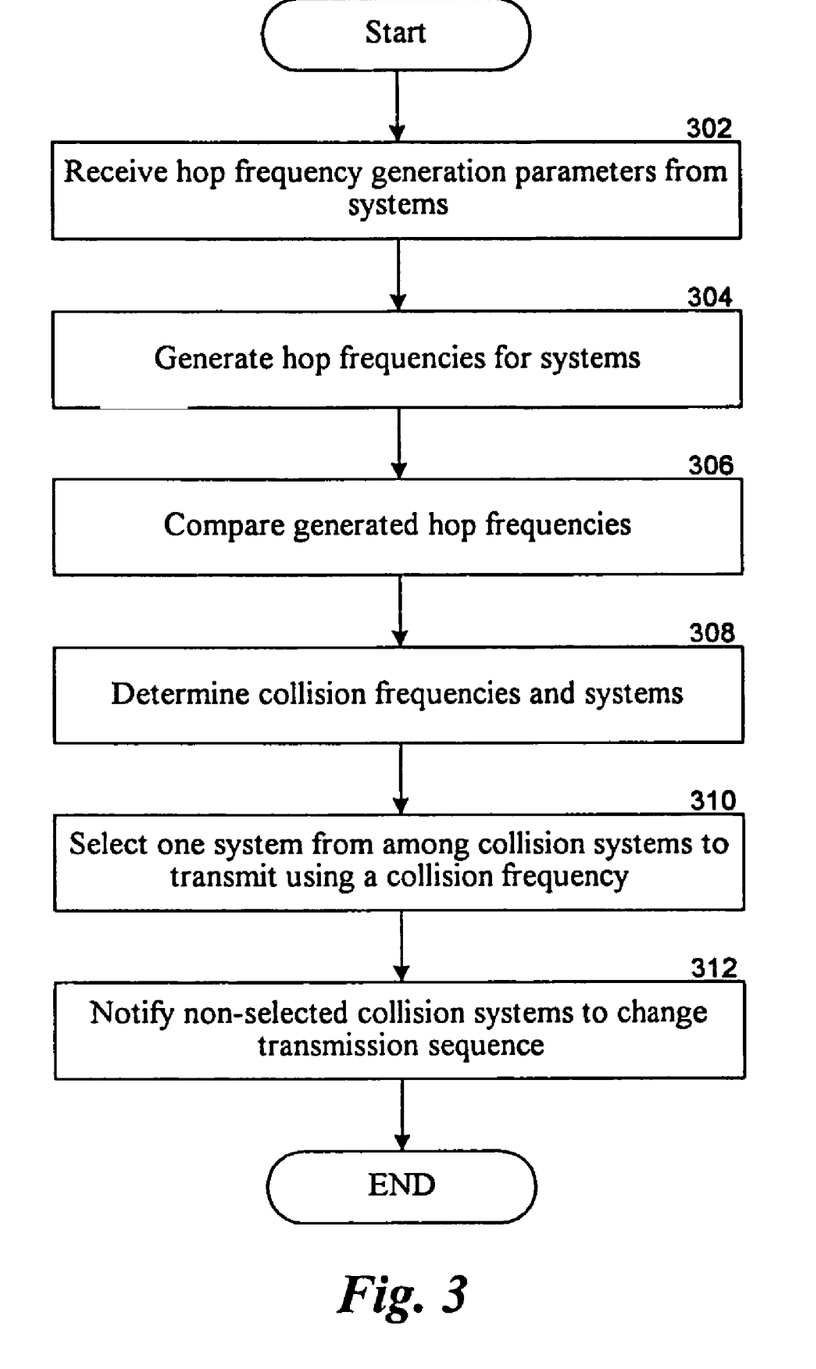
FIG. 3 is a flow diagram of a method for arbitrating transmissions among frequency-hopping spread spectrum (FHSS) systems using the arbiter, under the embodiment of FIG. 2.

FIG. 3 is a flow diagram of a method for arbitrating transmissions among frequency-hopping spread spectrum (FHSS) systems using the arbiter 202. The arbiter receives hop frequency generation parameters from communication systems to which it is coupled, at block 302. The hop frequency generation parameters include parameters of the frequency bands and transmission times, but are not so limited.

The arbiter 202 generates, at block 304, hop frequencies for the systems using the corresponding frequency generation parameters. As discussed herein, transmission collisions occur between different types of wireless communication systems, such as collisions between Bluetooth™ systems and IEEE 802.11b systems. To calculate collision frequencies, the arbiter calculates the hop frequency bands as defined in the specifications of the respective systems. For 802.11b, the instantaneous transmission bandwidth is fixed. As an alternative, the systems can provide calculated frequency bands to the arbiter.

The arbiter compares the calculated hop frequency sequence values, at block 306, using a number of methods described below. Collision frequencies and systems are identified as a result of the comparison, at block 308. Depending on network parameters collisions may be co-channel collisions or hits, adjacent channel collisions, or both. There also may be multiple collisions on different frequencies.

A communication system is selected to transmit from among the identified colliding systems using criteria discussed herein, at block 310. This system is permitted to transmit using the channel or frequency identified with the collision. The arbiter reports the results of the arbitration to any non-selected systems identified as being involved in a collision, at block 312.

The non-selected systems identified as being involved in impending collisions are notified to change sequence or are disabled. For example, all other communication systems associated with the frequency collision receive notification to suppress the communications that are the source of the collision. In Bluetooth™ systems a change of sequence can be accomplished by switching the system to a different piconet. After the Bluetooth™ system has changed sequence, it will submit the new sequence to the arbiter for approval. If there are no collisions with the new sequence, the system is allowed to transmit, preserving the bandwidth that would have been lost in a collision.

While this method generally describes arbitration among frequency-hopping systems, particular alternative embodiments will now be described relating to the types of systems that make up the communication network in which the arbitration is being performed. First, a method is described for arbitrating transmissions in a communication system including Bluetooth™ FHSS systems. An arbitration method is presented next that arbitrates among different system types including both Bluetooth™ FHSS systems and DSSS systems. An arbitration method is presented, finally, that provides optimal frequency allocation when arbitrating among different system types.

In general, alternatives and alternative embodiments described herein are substantially similar to previously described embodiments, and common elements and acts or steps are identified by the same reference numbers. Only significant differences in construction or operation are described in detail.

Figure 4:
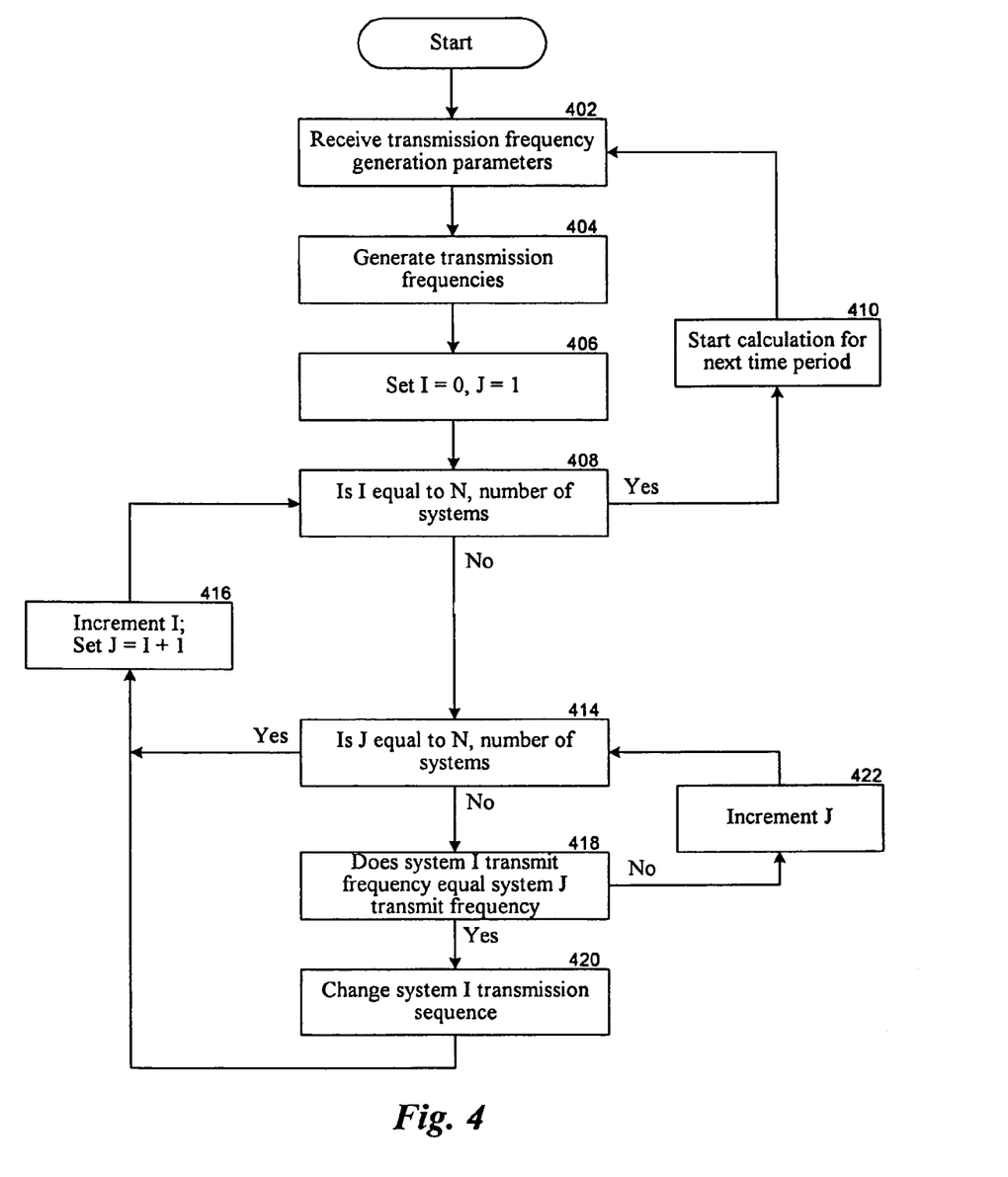
FIG. 4 is a flow diagram of a method for arbitrating transmissions among Bluetooth™ frequency-hopping spread spectrum (FHSS) systems, under, a first alternative embodiment.

FIG. 4 is a flow diagram of a method for arbitrating transmissions among Bluetooth™ frequency-hopping spread spectrum (FHSS) systems, under a first alternative embodiment. With reference to FIG. 2, the arbiter 202 is arbitrating among four Bluetooth™ systems, FHSS System 0 204, FHSS System 1 206, FHSS System 2 208, and FHSS System 3 210, for this example. The choice of four systems illustrates the relative complexity of adding more wireless systems to the arbitration logic 203, without adding a large amount of extra description herein. Each algorithm employed by, the systems is expandable to handle N wireless systems operating with arbitration.

To further simplify the arbiter for this example, the four Bluetooth™ systems 204-210 are assumed to have synchronized slot boundaries. The slot boundaries are the bounds of a transmission on a discrete frequency band in the Bluetooth™ protocol. Further details regarding aligning slot boundaries may be found in U.S. Provisional Patent Application No. 60/288,294. Simplifying the arbiter in this manner allows the arbitration to run once per Bluetooth™ slot. If the slot boundaries were not aligned, the transmissions of each system would be checked for interference on both sides of each boundary, resulting in much larger amounts of processing to detect all collisions. However, there may be other systems where such boundary synchronization is not beneficial. In those systems, interference mitigation is applied using calculations which determine when boundaries occur in relation to other arbitrated systems, and apply the arbitration to both sides of the boundary.

In operation, and with reference to FIG. 4, the arbiter receives transmission frequency generation parameters, at block 402. In Bluetooth™ systems the arbiter collects these frequency calculation parameters by reading the Bluetooth™ system address and the native clock values from each system. The systems return the following respective elements during one example slot:

FHSS System 0 204 returns System Address X, and clock value Y;

FHSS System 1 206 returns System Address C, and clock value D;

FHSS System 2 208 returns System Address R, and clock value S; and

FHSS System 3 210 returns System Address M, and clock value N.

The arbiter generates or calculates the transmission frequencies of each system, at block 404. The Bluetooth™ system defines 79 transmission bands, each 1 MHz wide. For Bluetooth™ systems, the transmit frequency is calculated using the Bluetooth™ system address, and the native clock value. The calculation is defined in "Specification of the Bluetooth System," version 1.1: http://www.bluetooth.org/specifications.htm. The following frequencies are used for the slot of this example:

FHSS System 0 204 will transmit on frequency band 32;
FHSS System 1 206 will transmit on frequency band 23;
FHSS System 2 208 will transmit on frequency band 32; and
FHSS System 3 210 will transmit on frequency band 32.

Continuing with the arbitration, generally, a decision tree implements a FOR loop which checks each wireless system for interference. Each system is referenced using a system index, or index. In this example, System 0 uses index 0, System 1 uses index 1, System 2 uses index 2, and System 3 uses index 3, for example. When the index is equal to 1, the arbiter checks the transmission frequency of that system with the transmission frequencies of all systems with higher index numbers. If a frequency collision is detected, the transmitter of the system having the lower index is suppressed or disabled. Therefore, in this example, the system I transmitter is disabled. On certain Bluetooth™ radios, the transmitter is disabled by writing to a register associated with the transmitter system to disable the transmission before it begins. When the system I transmitter is disabled, or the transmission frequency has been compared with all systems having a higher index and no frequency collision has been detected, the FOR loop starts again using the system with the next highest index value.

The FOR loop is now described with reference to this particular example. At block 406, the variable I is set equal to 0 and a variable J is set equal to 1. The value of J is started one higher than the value of I so that a system transmit frequency is not compared with itself. This also avoids a system being compared with a transmit frequency of a transmitter which has already been disabled.

A determination is made, at block 408, whether I is equal to the number of systems among which arbitration is performed. If I is equal to the number of arbitrated systems, then arbitration is complete for a particular communication period and calculations are started for the next communication period to be evaluated, at block 410. Operation then returns to block 402 and proceeds as described herein.

If I is not equal to the number of arbitrated systems, then a determination is made, at block 414, whether J is equal to the number of arbitrated systems. If J is equal to the number of arbitrated systems, then all arbitrated systems have been compared with the currently evaluated system. Therefore, I is incremented and J is set equal to the value of I plus 1, at block 416, and operation proceeds, at block 408, as described herein.

If J is not equal to the number of arbitrated systems, at block 414, then operation continues by comparing the transmit frequency of the system having index I to the transmit frequency of the system having index J for the particular time period, at block 418. For example, during the first pass through this flow diagram I=0 and J=1, so the transmit frequency of FHSS System 0 is compared to that of FHSS System 1. Since 23 is not equal to 32, the transmitter of FHSS System 0 remains enabled, J is incremented, at block 422, and operation proceeds at block 414.

The transmit frequency of FHSS System 0 is now compared to that of FHSS System 2, at block 414. Since 32 is equal to 32, the arbiter disables transmission by FHSS System 0 (the lower of the two indices) on frequency band 32 during this time period or slot, at block 420. Once FHSS System 0 is disabled, no more comparisons are necessary between FHSS System 0 and other systems. The variable values I and J are reset, at block 416, so that the remaining systems can be compared for the particular time period.

Continuing with this example at block 416, I is incremented to 1, and J is set to I plus 1, or 2. Since I is still not equal to the total number of systems being evaluated (four), at block 408, and J is still not equal to the total number of systems being evaluated, at block 414, the transmit frequencies of FHSS System 1 and System 2 are compared, at block 418. Since 23 is not equal to 32, the arbiter increments J, at block 422. With I now set to 1 and J set to 3, the transmit frequency of FHSS System 1 is compared to that of FHSS System 3. Again, 23 is not equal to 32. The arbiter now increments J to 4, at block 422. The variable J is now equal to the number of systems being evaluated (four), at block 414. Thus, I is incremented to 2 and J is set to 3, at block 416.

Since I is still not equal to the total number of systems being evaluated (four), at block 408, and J is still not equal to the total number of systems being evaluated, at block 414, the transmit frequencies of FHSS System 2 and System 3 are compared, at block 418. Since 32 is equal to 32, the arbiter suppresses or disables transmission by FHSS System 2 on frequency band 32 during this time period or slot, at block 420. Once FHSS System 2 is disabled, no more comparisons are necessary between FHSS System 2 and other systems.

The variable values I and J are reset, at block 416, so that I equals 3 and J equals 4. Now, J is equal to the number of systems being evaluated, at block 414, and the loop ends. The condition check of I, at block 408, completes the comparison for this particular time period, and the arbiter resets the loop to the beginning of arbitration via blocks 410 and 402, thereby repeating the evaluation for the next communication time period or slot as described herein. The purpose of showing the unlikely occurrence of three systems occupying the same frequency band is to illustrate that only one of the conflicting transmitters, FHSS System 3, will transmit during this time slot, no matter how many conflicts arise.

The arbitration method of FIG. 4 is advantageous because it is easy to implement. The arbitration includes interlocking FOR loops, which can be implemented in most high level programming languages. Another advantage is that it uses an indexed priority system, wherein the systems with higher indexes are more likely to transmit. The arbitration logic uses the indexes to prioritize transmissions based on system factors relating to optimal performance. This optimization may prioritize bandwidth to certain users, Quality of Service (QoS) of certain connections, or equal bandwidth to all users, depending on operator defined settings. Details regarding one method for further optimizing the system may be found in United States Patent Application titled "Connection Initiation in Wireless Networks Including Load Balancing" filed 3 Nov. 2003, application Ser. No. 10/701,374, and related U.S. Provisional Patent Application No. 60/288,270. Of course, alternative embodiments may employ differing processes besides FOR loops, and/or not employ prioritization, as those skilled in the relevant art will recognize.

In the arbitration system and method described above for use between Bluetooth™ systems, processing operations, and consequently resources, increase on the order of N squared as the number of arbitrated systems increases. For smaller numbers of systems this is not an issue, but as the number of arbitrated systems in the communication system increases, processing power and resources may become an issue. Thus an alternative arbitration method is presented next that arbitrates among different system types.

In the Bluetooth™ arbitration system described above, the arbiter assumes that the frequency bands can be identified discretely with indexing. To arbitrate between different system types, for example between Bluetooth™ systems and DSSS systems, the transmit frequency bands are indexed to provide sufficient guard bands to allow calculation of frequency interference. In this method, rather than using indexed frequency bands, such as frequency bands 23 and 32 used in the example above, each system uses an upper and a lower frequency boundary to define the range of the frequency transmission band. The upper and lower boundaries are then compared during the interference determination.

In general, if the lower frequency boundary of system I is above the upper frequency boundary of system J then system I does not interfere with system J. Further, if the upper frequency boundary of system I is below the lower frequency boundary of system J, then system I does not interfere with system J. Otherwise, if either of these conditions are violated then system I interferes with system J.

Figure 5:
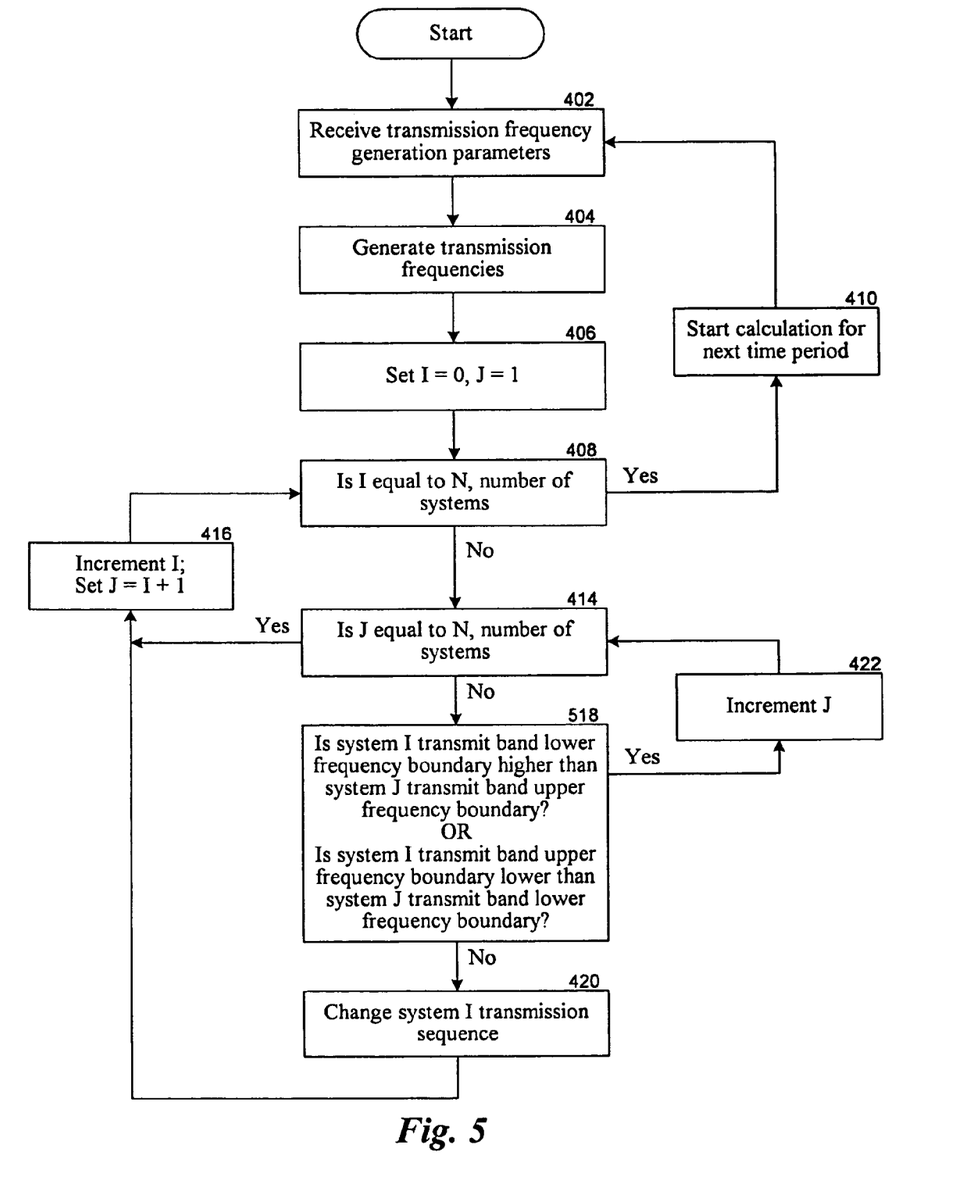
FIG. 5 is a flow diagram of a method for arbitrating transmissions among Bluetooth™ frequency-hopping spread spectrum (FHSS) systems and Direct Sequence Spread Spectrum (DSSS) systems, under a second alternative embodiment.

FIG. 5 is a flow diagram of a method for arbitrating transmissions among Bluetooth™ frequency-hopping spread spectrum (FHSS) systems and Direct Sequence Spread Spectrum (DSSS) systems, under an alternative embodiment. With reference to FIG. 2, the arbiter 202 is arbitrating among three Bluetooth™ systems, FHSS System 0 204, FHSS System 1 206, and FHSS System 2 208, along with one DSSS system, DSSS System 4 212, for this example.

In general, blocks 402 through 422 were described with reference to FIG. 4; therefore, only deviations from those methods are described in this example. The arbiter receives transmission frequency generation parameters, at block 402. Therefore, for FHSS Systems 0 204 through 2 208, the Bluetooth systems, the arbiter collects frequency calculation parameters by reading the Bluetooth™ system address and the native clock values from each system. For DSSS System 4 212 the frequency generation information takes the following form, but is not so limited:

Transmit Band: from X to Y, where X and Y are values representing a particular MHz offset from a base frequency of 2.4 GHz, and Y is greater than X Transmit Request True In generating or calculating transmission frequencies, at block 404, the arbiter calculates transmit frequencies for the FHSS Systems 0 through 2 using the system addresses and the native clock values. A frequency band is calculated which covers one MHz, per the Bluetooth™ specifications. For the DSSS System 4 212, the arbiter uses a fixed, instantaneous bandwidth. Therefore, the following frequencies are used for a slot of this example:

FHSS System 0 204 transmits on frequency band 31.5 to 32.4 MHz;

FHSS System 1 206 transmits on frequency band 22.5 to 23.4 MHz;

FHSS System 2 208 transmits on frequency band 43.5 to 44.4 MHz; and

DSSS System 4 212 transmits on frequency band 20.0 to 25.0 MHz.

The arbiter proceeds through blocks 406 through 422 to determine frequencies of any channel collisions, in the same manner as the embodiment of FIG. 4. However, the collision or interference test, at block 518, compares the frequency bands of the communication systems, as the following describes.

The arbiter begins by comparing the frequency band of System 0 with those of Systems 1, 2, and 4 during a first cycle through the loop including block 518. As a result of this comparison, System 0 continues to be enabled to transmit, because the frequency band 31.5 to 32.4 does not overlap with frequency bands 22.5 to 23.4, 43.5 to 44.4, and 20.0 to 25.0.

The arbiter then compares the frequency band of System 1 with those of Systems 2 and 4 during a second cycle through the loop including block 518. As a result, System 1 is disabled because its lower frequency band boundary, 22.5, is lower than the upper frequency band boundary, 25.0, of System 4, and because its upper frequency band boundary, 23.4, is higher than the lower frequency band boundary, 20.0, of System 4. Further, because System 4 has a higher system index, 4, than the System 1 index, 1, System 4 has a higher priority. Once System 1 is disabled, no more comparisons are necessary between System 1 and other systems.

On a time basis, the arbiter can change the system indexes with a resulting priority shift. This priority shift, when implemented, might allow the Bluetooth™ systems to transmit in the case of a collision with a DSSS system.

Continuing with the example, a third cycle through the loop including block 518 compares the frequency band of System 2 with that of System 4. As a result of this comparison, System 2 continues to be enabled to transmit, because the frequency band 43.5 to 44.4 does not overlap with frequency band 20.0 to 25.0.

In the arbitration system and method described above for use among Bluetooth™ systems and DSSS systems, particular combinations of transmit frequency bands and system priority indexes can result in non-optimal frequency allocation. Thus an alternative arbitration method is presented here that provides optimal frequency allocation when arbitrating among different system types.

Figure 6:
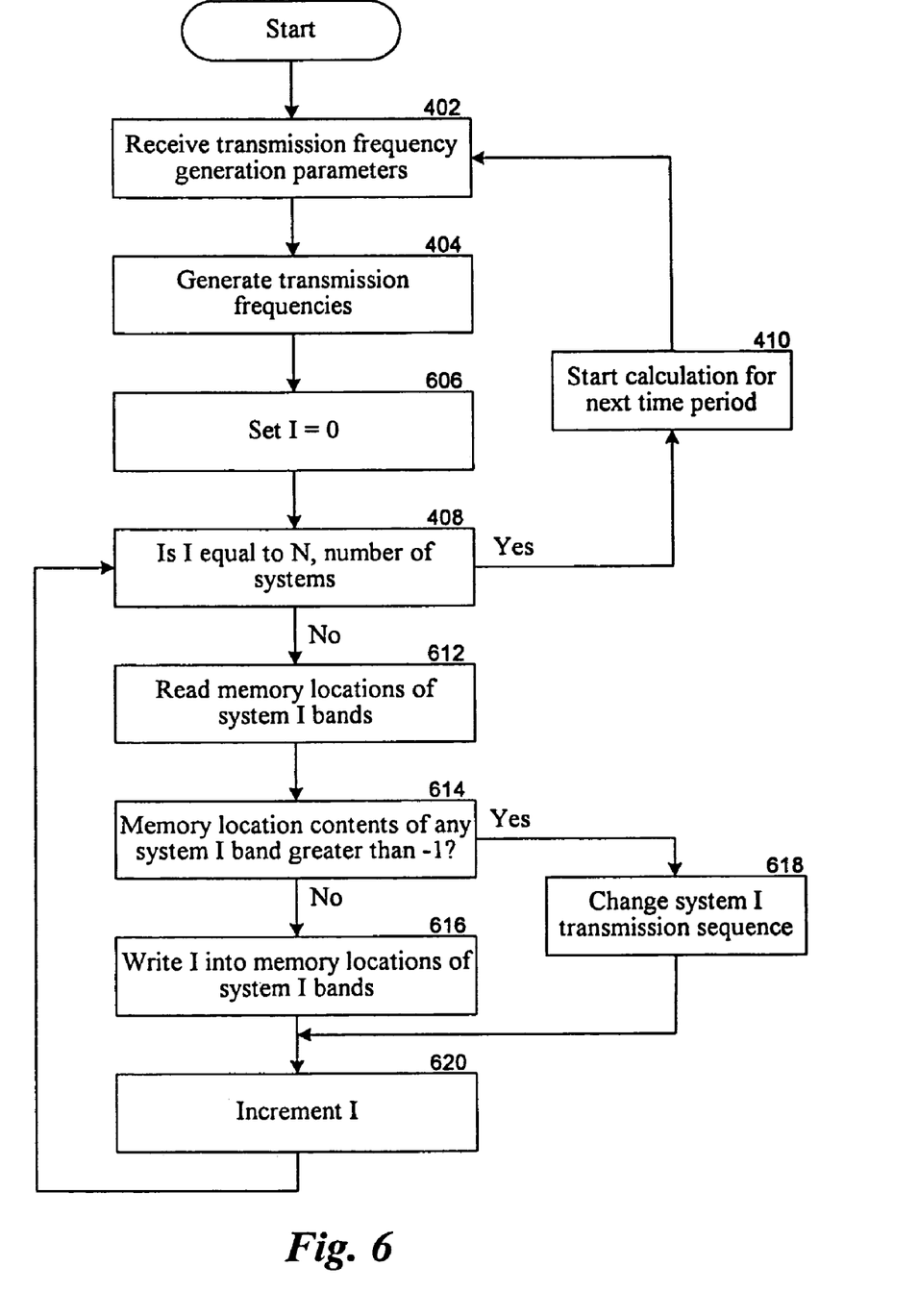
FIG. 6 is a flow diagram of a method for arbitrating transmissions among Bluetooth™ frequency-hopping spread spectrum (FHSS) systems and Direct Sequence Spread Spectrum (DSSS) systems while providing optimal frequency allocation, under a third alternative embodiment.

FIG. 6 is a flow diagram of one example for arbitrating transmissions among Bluetooth™ frequency-hopping spread spectrum (FHSS) systems and Direct Sequence Spread Spectrum (DSSS) systems while providing optimal frequency allocation, under another alternative embodiment. With reference to FIG. 2, the arbiter 202 is arbitrating among three Bluetooth™ systems, FHSS System 0 204, FHSS System 1 206, and FHSS System 3 210, along with one DSSS system, DSSS System 2 214. The systems remain in an indexed order, with the priority specified so that FHSS System 0 has the highest priority and FHSS System 3 the lowest priority or, in general, system N has the lowest priority.

In general, blocks 402 through 410 were described with reference to FIGS. 4 and 5; therefore, only deviations from those methods are described in this example. The arbiter receives transmission frequency generation parameters, at block 402. Therefore, the following frequencies are used for a slot of this example:

FHSS System 0 transmits on frequency band 20.5 to 21.4;
FHSS System 1 transmits on frequency band 31.5 to 32.4;
DSSS System 2 transmits on frequency band 20.0 to 25.0; and
FHSS System 3 transmits on frequency band 23.5 to 24.4.

Using the method described in FIG. 5 for this example, System 0 would be disabled as interfering with System 2. Further arbitration then disables System 2 as interfering with System 3, thereby freeing up the bandwidth that System 0 could use. However, since the System 0 transmitter is already disabled, the bandwidth goes unused. While unused bandwidth is not as problematic as channel interference, avoidance of non-optimal frequency allocation further increases system transmission efficiency.

The arbiter of the third alternative embodiment avoids non-optimal frequency allocation using an algorithm that only grows at a rate that is an order of N. In general, the frequency bands to be arbitrated are divided into several discrete bands. Each discrete band is assigned and associated memory location where the index of the corresponding transmitter is stored.

There is a trade-off in the number of bands used versus the width of the bands. When the arbitrated systems only include Bluetooth™ systems, the discrete bands can represent a 1 MHz frequency band without resulting in information loss. For a communication system in which there are multiple modulation systems, the discrete bands are selected to provide the smallest unit of overlap between different systems in order to avoid information loss. A wider band may be used to conserve memory space, at the expense of optimization.

In generating or calculating transmission frequencies, at block 404, the assigned memory locations corresponding to each discrete frequency band are set to contain the value −1. The FOR loop uses the variable I as previously described herein; however, the variable J is not used. Instead, the memory locations of the frequency bands are modified. Therefore, the following discrete frequency bands are used for the time period of this example, in which 1 MHz bands from 2.4 GHz to 2.5 GHz are arbitrated, but the embodiment is not so limited:

FHSS System 0 transmits on discrete band 6;
FHSS System 1 transmits on discrete band 15;
DSSS System 2 transmits on discrete bands 5 through 10; and
FHSS System 3 transmits on discrete band 8.

In general, when the arbiter determines the memory locations that overlap the frequency bands of system I have the value −1 stored in them, then the system index value of I is stored in these locations. In this way, the arbiter reserves the bands for the transmission of that system. If a memory location for any overlapping band does not equal the value −1, then the corresponding band has already been reserved, and the arbiter disables transmission by system I during this time period or slot.

At block 606, the variable I is set to equal 0, and operation proceeds to block 408 as previously described herein. With I equal to 0, the arbiter reads the memory location associated with discrete band 6 of System 0, at block 612. As the arbiter has not previously written values other than −1 to the band 6 memory location, the arbiter reads the value −1 from the band 6 memory location.

At block 614, the arbiter determines the value −1 is not greater than the value −1, so the system index value, 0, is written to the band 6 memory location to reserve this location, at block 616. The value of I is incremented to 1, at block 620.

With I equal to 1, the arbiter reads the memory location associated with the discrete band 15 of System 1, at block 612. As the arbiter has only written a value other than −1 to the band 6 memory location, the value −1 is read from the band 15 memory location. The value −1 is not greater than the value −1, so the system index value, 1, is written to the band 15 memory location to reserve it, at block 616. The value of I is incremented to 2, at block 620.

With I equal to 2, the arbiter reads the memory locations associated with the discrete bands 5 through 10 of System 2, at block 612. As the arbiter has reserved band 6 by previously writing the value 0 to the band 6 memory location, the value 0 is read from the band 6 memory location. The value 0 is greater than −1, so the System 2 transmitter is disabled or transmission sequence is changed, at block 618. The value of I is then incremented to 3, at block 620.

With I equal to 3, the arbiter reads the memory locations associated with the discrete band 8 of System 3, at block 612. As the arbiter has only written a value other than −1 to the band 6 and band 15 memory locations, the value −1 is read from the band 8 memory location. The value −1 is not greater than −1, so the system index value, 3, is written to the band 8 memory location to reserve it, at block 616. The value of I is incremented to 4, at block 620.

The condition check of I, at block 408, completes the comparison for this particular time period because I is now equal to the number of systems being evaluated (four). Thus, this loop ends and the arbiter resets the loop to the beginning of arbitration via blocks 410 and 402, thereby repeating the evaluation for the next time period or slot as described herein.

Figure 7:
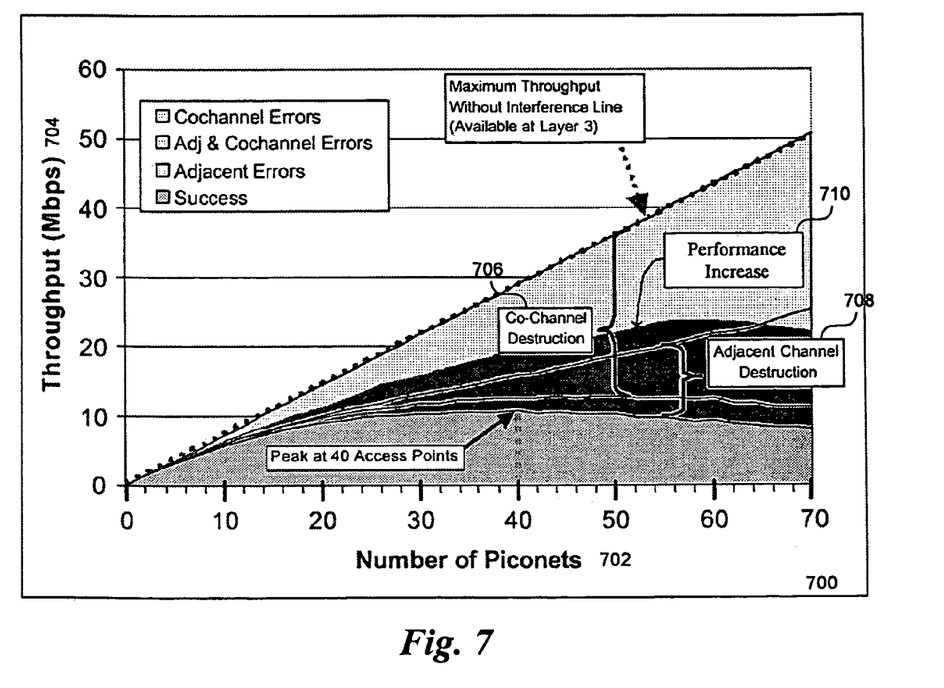
FIG. 7 is a performance chart showing a performance increase when arbitrating among Bluetooth™ frequency-hopping spread spectrum (FHSS) systems, under the disclosed embodiments.

FIG. 7 is a performance chart 700 showing a performance increase when arbitrating among Bluetooth™ frequency-hopping spread spectrum (FHSS) systems, under the above embodiments. The chart 700 shows that, without arbitration, as the numbers of FHSS wireless systems 702 increases, the throughput 704 performance of all systems decreases because of mutual interference between transmitters. The performance decreases are due to co-channel destruction or interference 706 and adjacent channel destruction or interference 708, as described above. Use of the arbitration systems and methods described therein leads to a significant performance increase 710 when compared to the performance without arbitration.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "above," "below," and words of similar import, when used in this application, shall refer to this application as a whole and not to any particular portions of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other communication systems, not only for the communication systems described above.

Incorporated by reference herein are all of the above references, patents, or patent applications and the following United States patent applications, which are assigned to the assignee of this application: application Ser. No. 10/700,788, filed 3 Nov. 2003, entitled WIRELESS BASE STATION NEIGHBOR DISCOVERY IN A COMMUNICATION SYSTEM, SUCH AS A SYSTEM EMPLOYING A SHORT-RANGE FREQUENCY-HOPPING SCHEME; application Ser. No. 10/139,130, filed 2 May 2002, entitled WIRELESS BASE STATION-TO-BASE STATION SYNCHRONIZATION IN A COMMUNICATION SYSTEM, SUCH AS A SYSTEM EMPLOYING A SHORT-RANGE FREQUENCY HOPPING SCHEME now U.S. Pat. No. 7,151,757, issued 12 Dec. 2002; application Ser. No. 10/701,374, filed 3 Nov. 2003, entitled CONNECTION INITIATION IN WIRELESS NETWORKS INCLUDING LOAD BALANCING; application Ser. No. 10/701,370, filed 3 Nov. 2003, entitled METHOD AND SYSTEM FOR INDICATING LINK QUALITY AMONG NEIGHBORING WIRELESS BASE STATIONS now U.S. Pat. No. 7,076,274, issued 11 Jul. 2006; and application Ser. No. 10/218,178, filed 12 Aug. 2002, entitled VIRTUAL BLUETOOTH DEVICES AS A MEANS OF EXTENDING PAIRING AND BONDING IN A BLUETOOTH NETWORK, now U.S. Pat. No. 7,170,857, issued 30 Jan. 2007. Aspects of the invention can be modified, if necessary, to employ the systems, functions and concepts of the various patents and applications described above to provide yet further embodiments of the invention. Further, the elements and acts of the various embodiments described above can be combined to provide further embodiments.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A wireless communication system comprising:
   two or more radios coupled to at least one wireless network, wherein the two or more radios are frequency-hopping radios;
   at least one arbiter coupled among the two or more radios and the wireless network, wherein the at least one arbiter:
      accepts hop frequency generation parameters from the two or more radios;
      generates hop frequencies using the hop frequency generation parameters;
      compares the generated hop frequencies and identifies hop frequencies that cause collisions during at least one communication time slot;
      arbitrates among the two or more radios by,
         selecting one of the two or more radios to transmit using the identified hop frequencies during the at least one communication time slot in which collisions are identified, and
         suppressing transmissions by non-selected radios on the identified hop frequencies; and
      reports results of the arbitration to the two or more radios.

2. The system of claim 1, wherein the hop frequencies include a single indexed frequency band, wherein comparing further comprises:
   prioritizing the two or more radios according to an assigned system index;
   selecting a radio having the lowest assigned system index;
   comparing the single indexed frequency band of the selected radio with the single indexed frequency band of each radio having a higher assigned system index; and
   selecting the radio having the highest assigned system index from among the identified radios having the same single indexed frequency band during each comparison of the single indexed frequency bands.

3. The system of claim 1, wherein the hop frequencies include an upper boundary and a lower boundary, wherein comparing further comprises:
   prioritizing the two or more radios according to an assigned system index;
   selecting a radio having the lowest assigned system index;
   comparing the lower boundary of the selected radio with the upper boundary of each radio having a higher assigned system index; and
   comparing the upper boundary of the selected radio with the lower boundary of each radio having a higher assigned system index.

4. The system of claim 3, wherein identifying hop frequencies that cause collisions comprises:
   identifying selected radios for which the lower boundary is lower than the upper boundary of a radio having a higher assigned system index during each comparison of the lower boundary of the selected radio; and
   identifying selected radios for which the upper boundary is higher than the lower boundary of a radio having a higher assigned system index during each comparison of the upper boundary of the selected radio.

5. The system of claim 1, wherein the hop frequencies for each radio comprise discrete bands, wherein comparing the hop frequencies, identifying hop frequencies that cause collisions, and arbitrating further comprise:

allocating a memory location for each of the discrete bands, and initializing all memory locations with a negative integer value;

prioritizing the two or more radios according to an assigned system index;

selecting a radio having the lowest assigned system index;

reading the memory locations corresponding to the discrete bands of the selected radio;

determining whether contents of each read memory location are equal to the known flag value; and writing the assigned system index of the selected radio to each memory location corresponding to the discrete bands of the selected radio when the content of each read memory location equals the known flag value, wherein the discrete bands of the selected radio are reserved.

6. The system of claim 5, wherein selecting one of the two or more radios to transmit further comprises suppressing a transmission of the selected radio when the content of each read memory location does not equal the known flag value.

7. The system of claim 1, wherein at least one function of the at least one arbiter is distributed among the two or more radios.

8. The system of claim 1, wherein the at least one arbiter is hosted on one of the two or more radios.

9. The system of claim 1, wherein the at least one arbiter is coupled among the two or more radios using at least one communication network.

10. A method for reducing interference in short-range wireless, frequency-hopping communication systems, comprising:

receiving at least one frequency generation parameter from each of two or more short-range wireless communication systems;

determining a transmit frequency band for each of the two or more wireless communication systems during at least one future time period using the at least one frequency generation parameter;

comparing the calculated transmit frequency of each of the two or more wireless communication systems for the future time period;

identifying colliding systems and colliding frequencies for the future time period using results of the comparison;

selecting one identified colliding system to transmit over the associated colliding frequency during the future time period; and suppressing transmissions by non-selected colliding systems over the associated colliding frequency during the future time period.

11. The method of claim 10, wherein the transmit frequency band includes a single indexed frequency band, wherein comparing further comprises:

prioritizing the two or more wireless communication systems according to an assigned system index, wherein a transmit priority of a corresponding wireless communication system is directly proportional to the system index;

selecting a wireless communication system from the ordered list, wherein selecting begins with the wireless communication system having the lowest assigned system index;

comparing the single indexed frequency band of the selected wireless communication system with the single indexed frequency band of each wireless communication system having a higher assigned system index; and repeating the ordering, the selecting, and the comparing until the wireless communication system having the highest assigned system index is selected.

12. The method of claim 11, wherein:

identifying colliding systems and colliding frequencies comprises identifying wireless communication systems having the same single indexed frequency band during each comparison of the single indexed frequency bands; and selecting one identified colliding system to transmit comprises selecting the wireless communication system having the highest assigned system index from among the identified wireless communication systems having the same single indexed frequency band during each comparison of the single indexed frequency bands.

13. The method of claim 10, wherein the transmit frequency band includes an upper boundary and a lower boundary, wherein comparing further comprises:

prioritizing the two or more wireless communication systems according to an assigned system index, wherein a transmit priority of a corresponding wireless communication system is directly proportional to the system index;

selecting a wireless communication system from the ordered list, wherein selecting begins with the wireless communication system having the lowest assigned system index;

comparing the lower boundary of the selected wireless communication system with the upper boundary of each wireless communication system having a higher assigned system index;

comparing the upper boundary of the selected wireless communication system with the lower boundary of each wireless communication system having a higher assigned system index; and repeating the ordering, the selecting, and the comparing until the wireless communication system having the highest assigned system index is selected.

14. The method of claim 13, wherein:

identifying colliding systems and colliding frequencies comprises, identifying selected wireless communication systems for which the lower boundary is lower than the upper boundary of a wireless communication system having a higher assigned system index during each comparison of the lower boundary of the selected wireless communication system, and identifying selected wireless communication systems for which the upper boundary is higher than the lower boundary of a wireless communication system having a higher assigned system index during each comparison of the upper boundary of the selected wireless communication system; and selecting one identified colliding system to transmit comprises, selecting the wireless communication system having the highest assigned system index from among the identified colliding systems during each comparison of the lower boundary of the selected wireless communication system and each comparison of the upper boundary of the selected wireless communication system.

15. The method of claim 10, wherein the transmit frequency band for each wireless communication system comprises discrete bands, wherein comparing the calculated transmit frequency, identifying colliding systems, and selecting one identified colliding system further comprises:

allocating a memory location for each of the discrete bands, and initializing all memory locations with a known flag value;

prioritizing the two or more wireless communication systems according to an assigned system index, wherein a transmit priority of a corresponding wireless communication system is inversely proportional to the system index;

selecting a wireless communication system from the ordered list, wherein selecting begins with the wireless communication system having the lowest assigned system index;

reading the memory locations corresponding to the discrete bands of the selected wireless communication system;

determining whether contents of each read memory location are equal to the known flag value; and writing the assigned system index of the selected wireless communication system to each memory location corresponding to the discrete bands of the selected wireless communication system when the content of each read memory location equals the known flag value, wherein the discrete bands of the selected wireless communication system are reserved.

16. The method of claim 15, wherein suppressing transmissions by non-selected colliding systems further comprises suppressing a transmission of the selected wireless communication system when the content of each read memory location does not equal the known flag value.

17. The method of claim 16, further comprising:
selecting the wireless communication system having the next highest system index;
reading the memory locations corresponding to the discrete bands of the next selected wireless communication system;
determining whether contents of each read memory location are equal to the known flag value; and
writing the assigned system index of the selected wireless communication system to each memory location corresponding to the discrete bands of the next selected wireless communication system when the contents of each read memory location equal the known flag value, wherein the discrete bands of the next selected wireless communication system are reserved.

18. The method of claim 10, wherein the interference includes at least one of co-channel interference and adjacent channel interference.

19. The method of claim 10, further comprising prioritizing the two or more wireless communication systems, wherein prioritizing uses a method selected from among prioritizing based on bandwidth, prioritizing based on users of the wireless communication systems, and prioritizing based on Quality of Service.

20. A method for minimizing transmission collisions among two or more frequency-hopping radios, comprising:
calculating and comparing hop frequencies for each of the two or more frequency-hopping radios during at least one time period using at least one frequency generation parameter received from the two or more frequency-hopping radios;
identifying impending transmission collisions using results of the comparison;
selecting one of the two or more frequency-hopping radios to transmit over a frequency associated with the impending transmission collisions during the at least one time period; and
suppressing transmissions on the calculated hop frequencies by non-selected radios of the two or more frequency-hopping radios during the at least one time period.

21. The method of claim 20, wherein suppressing transmissions further includes:
notifying non-selected radios to change transmission sequence;
receiving the changed transmission sequence from the non-selected radios; and
approving the changed transmission sequence.

22. The method of claim 20, wherein suppressing transmissions further includes disabling transmitters of the non-selected radios.

23. A system for managing channel collisions, including:
an arbiter coupled among two or more communication devices including wireless frequency-hopping devices, wherein the arbiter is configured to,
generate a transmit frequency for each of the two or more communication devices during at least one time period using at least one frequency generation parameter received from the two or more communication devices;
compare the generated transmit frequency of each of the two or more communication devices and identify impending transmission collisions for the at least one time period;
select one of the two or more communication devices identified as being involved in the impending transmission collision to transmit during the at least one time period of the impending transmission collision; and
suppress transmissions by non-selected communication devices during the at least one time period for the generated transmit frequencies, wherein the impending transmission collision is avoided.

24. The system of claim 23, wherein the communication devices are selected from among Frequency-Hopping Spread Spectrum devices, Direct Sequence Spread Spectrum devices, Bluetooth™ devices, and devices using Institute of Electrical and Electronic Engineers (IEEE) 802.11 protocol.

25. The system of claim 23, wherein the at least one frequency generation parameter is selected from among clock values, device addresses, frequency bands, and transmission times.

26. The system of claim 23, wherein suppressing transmissions further comprises disabling the non-selected communication devices.

27. The system of claim 23, wherein suppressing transmissions further comprises directing the non-selected communication devices to transmit on at least one frequency other than a frequency associated with the at least one impending transmission collision during the at least one time period of the impending transmission collision, wherein bandwidth of the non-selected communication devices is recovered during the at least one time period of the impending transmission collision.

28. The system of claim 23, wherein the communication devices further include cellular telephones, personal digital assistants, and personal computers.

29. A system for increasing bandwidth utilization by minimizing channel interference among two or more wireless radios including frequency-hopping radios, comprising:
an arbitration device included among the two or more wireless radios, wherein the arbitration device,
calculates and compares hop frequencies for the two or more wireless radios using at least one frequency generation parameter received from the two or more wireless radios;

recognizes at least one impending transmission collision during at least one communication time slot using results of the comparison;

selects one of the two or more wireless radios to transmit over a frequency associated with the at least one impending transmission collision; and directs non-selected radios of the two or more wireless radios to transmit on at least one frequency other than the frequency associated with the at least one impending transmission collisions during the at least one communication time slot, wherein bandwidth of the non-selected radios is recovered for the at least one communication time slot.

30. A communications system comprising:

two or more wireless radios coupled among at least one network, wherein the two or more wireless radios are frequency-hopping radios, wherein at least one of the two or more wireless radios includes an arbitration component that increases bandwidth utilization by minimizing channel interference among the two or more wireless radios;

wherein the arbitration component, calculates and compares hop frequencies for each of the two or more wireless radios during at least one time period using frequency generation parameters received from the two or more wireless radios;

identifies impending transmission collisions using results of the comparison;

selects one of the two or more wireless radios to transmit over a frequency associated with the impending transmission collisions during the at least one time period; and directs non-selected radios of the two or more wireless radios to transmit on at least one frequency other than the frequency associated with the impending transmission collisions during the at least one time period, wherein bandwidth of the non-selected radios is recovered for the at least one time period.

31. A device for reducing mutual channel interference by arbitrating among wireless radios including frequency-hopping radios, wherein the device is configured to:

receive frequency generation parameters from two or more wireless radios and generate transmit frequency bands for the two or more wireless radios using the frequency generation parameters;

identify channel interference by comparing generated transmit frequency bands, wherein co-channel collisions and adjacent channel collisions are identified along with at least one collision frequency band for at least one communication time slot;

select a wireless radio to transmit over the at least one collision frequency band during the at least one communication time slot; and direct non-selected wireless radios to transmit using at least one frequency band other than the at least one collision frequency band during the at least one communication time slot.

32. A computer readable medium including executable instructions which, when executed in a processing system, supports elimination of mutual channel interference between wireless frequency-hopping communication systems by:

receiving at least one frequency generation parameter from each of two or more wireless communication systems;

determining a transmit frequency band for each of the two or more wireless communication systems during at least one time period using the at least one frequency generation parameter;

comparing the calculated transmit frequency of each of the two or more wireless communication systems for each of the at least one time periods;

identifying colliding systems and colliding frequencies for each of the at least one time periods using results of the comparison;

selecting one identified colliding system to transmit over the associated colliding frequency during each of the at least one time periods; and suppressing transmissions by non-selected colliding systems over the associated colliding-frequency during each of the at least one time periods.

33. A system for reducing mutual channel interference between wireless frequency-hopping devices, comprising:

means for receiving at least one frequency generation parameter from each of two or more wireless devices;

means for determining a transmit frequency band for each of the two or more wireless devices during at least one future time period using the at least one frequency generation parameter;

means for comparing the calculated transmit frequency of each of the two or more wireless devices for each of the at least one future time periods;

means for identifying colliding systems and colliding frequencies for each of the at least one future time periods using results of the comparison;

means for selecting one identified colliding system to transmit over the associated colliding frequency during each of the at least one future time periods; and means for suppressing transmissions by non-selected colliding systems over the associated colliding frequency during each of the at least one future time periods.

* * * * *